(12) United States Patent
Dinzinger

(10) Patent No.: US 10,968,568 B2
(45) Date of Patent: Apr. 6, 2021

(54) METHOD FOR THE PRODUCTION OF PAPER, CARTON, OR CARDBOARD USING BAOBAB TREE BARK BAST FIBERS, BAOBAB FRUIT FIBERS, AND/OR NATAL FIG BAST FIBERS AS PAPER RAW MATERIAL

(71) Applicant: HOPE TREE INTERNATIONAL GMBH, Geretsried (DE)

(72) Inventor: Lambert Dustin Dinzinger, Geretsried-Gelting (DE)

(73) Assignee: HOPE TREE INTERNATIONAL GMBH, Geretsried (DE)

( * ) Notice: Subject to any disclaimer, the term of this patent is extended or adjusted under 35 U.S.C. 154(b) by 0 days.

(21) Appl. No.: 16/462,612

(22) PCT Filed: Nov. 20, 2017

(86) PCT No.: PCT/EP2017/079806
§ 371 (c)(1),
(2) Date: Aug. 1, 2019

(87) PCT Pub. No.: WO2018/091711
PCT Pub. Date: May 24, 2018

(65) Prior Publication Data
US 2020/0181845 A1    Jun. 11, 2020

(30) Foreign Application Priority Data

Nov. 21, 2016  (DE) ...................... 10 2016 222 952.4

(51) Int. Cl.
| | |
|---|---|
| D21H 11/12 | (2006.01) |
| D21C 5/00 | (2006.01) |
| D21H 11/14 | (2006.01) |
| D21H 15/10 | (2006.01) |
| D21H 17/28 | (2006.01) |
| D21H 17/60 | (2006.01) |
| D21H 19/38 | (2006.01) |
| D21H 21/28 | (2006.01) |
| D21H 27/00 | (2006.01) |
| D21H 27/10 | (2006.01) |
| D21J 3/00 | (2006.01) |

(52) U.S. Cl.
CPC .............. *D21H 11/12* (2013.01); *D21C 5/00* (2013.01); *D21H 11/14* (2013.01); *D21H 15/10* (2013.01); *D21H 17/28* (2013.01); *D21H 17/60* (2013.01); *D21H 19/385* (2013.01); *D21H 21/28* (2013.01); *D21H 27/002* (2013.01); *D21H 27/10* (2013.01); *D21J 3/00* (2013.01)

(58) Field of Classification Search
CPC ....................................................... D21H 11/12
See application file for complete search history.

(56) References Cited

FOREIGN PATENT DOCUMENTS

| FR | 369 657 A | 1/1907 |
| GB | 13158 A | 4/1905 |

OTHER PUBLICATIONS

Heike Pander, Baobab and Elephant:Best Friends?, Aug. 2016, baobastories.com (Year: 2016).*
Gitonga Njeru, Don't pooh-pooh it: Making paper from elephant dung, May 2016, BBC (Year: 2016).*
Griffin et al., Chemistry of Papermaking, 1894, p. 128 (Year: 1894).*
Atlternative Pulp and Paer Company, From Poop to Poopoopaper—The Process [downloaded from archive.org], Jul. 2016 [downloaded on Apr. 2, 2020]. (Year: 2016).*
Machine English Translation of French Patent 369,657. (Year: 1907).*
Smook, Handbook for Pulp and Paper Technologists, 1992, Angus Wilde Publications, 2nd edition, chapter 16. (Year: 1992).*

* cited by examiner

*Primary Examiner* — Anthony Calandra
(74) *Attorney, Agent, or Firm* — Stacey J. Farmer

(57) ABSTRACT

The invention relates to a method for the production of paper, carton, or cardboard using baobab tree bast fibers, baobab fruit fibers, and/or Natal fig fibers as paper raw material, comprising the steps of: obtaining baobab fruit fiber and/or baobab tree bast fiber as baobab raw material and/or Natal fig bast fiber as Natal fig raw material; fraying the baobab raw material and/or Natal fig raw material while adding water; heating and preferably bleaching the obtained fiber pulp; applying the fiber pulp to a sieving means comprising removing a portion of the added water in order to produce a paper fiber fleece; pressing the obtained paper fiber fleece; and drying the obtained paper fiber fleece. The invention further relates to paper, cardboard, or carton obtainable by a method of the invention, and their use for the production of natural paper, papier mâché, art paper, hygienic paper, tissue paper, graphic papers, paper, carton, or cardboard for packaging purposes, or paper for specialized technical purposes.

17 Claims, No Drawings

METHOD FOR THE PRODUCTION OF PAPER, CARTON, OR CARDBOARD USING BAOBAB TREE BARK BAST FIBERS, BAOBAB FRUIT FIBERS, AND/OR NATAL FIG BAST FIBERS AS PAPER RAW MATERIAL

CROSS-REFERENCE TO RELATED APPLICATIONS

This application is a national phase entry under 35 U.S.C. § 371 of International Patent Application PCT/EP2017/079806, filed Nov. 20, 2017, published as International Patent Publication WO 2018/079806 on May 24, 2018, which claims the benefit of German Patent Application DE 10 2016 222 952.4, filed on Nov. 21, 2016, the contents of all are hereby incorporated by reference.

FIELD OF THE INVENTION

The present invention relates to the field of paper production and is directed to a method for the production paper, carton, or cardboard using baobab tree bast fibers and baobab fruit fibers as baobab raw material, as well as the paper obtained by said method. The invention is further directed to a method for the production of paper, carton, or cardboard using Natal fig bast fibers as Natal fig raw material, as well as the paper obtained by said method. Likewise, the invention is directed to methods combining baobab raw material and Natal fig raw material. Furthermore, the invention is directed to the use of said paper, carton, or cardboard in further processing to paper products. When obtaining the baobab raw material or Natal fig raw material, a die-off of the tree is avoided. As raw material for the processing of hand-made and machine-made baobab or Natal fig paper, carton, or cardboard pure baobab tree bast fibers, baobab fruit fibers, and/or Natal fig bast fibers are used. The paper, carton, or cardboard obtained by the method described herein can comprise further paper fibers obtained from conventional paper raw materials or waste paper. The paper, carton, or cardboard, obtained by the method of the invention are characterized by their increased tear resistance compared with paper, carton, and cardboard made from conventional paper raw materials. The paper, carton, and cardboard are biologically degradable.

BACKGROUND OF THE INVENTION

Presently, numerous conventional production methods for paper, carton, and cardboard are applied that, for the purpose of obtaining raw material, use plant material that entails killing of the plant or the tree, respectively. Although renewable raw materials are used in these known methods, these methods counteract the preservation of our ecosystem and ultimately our planet, because the time of regrowth, i.e. the regeneration of the plant material, can mostly take decades. Therefore, the present paper demand cannot be met along with the preservation of a plant stock relevant for ecological equilibrium when such conventional production methods are employed, even if renewable raw materials are used. Therefore, waste paper is nowadays one of the main components in the production of paper, carton, and cardboard. Also in Europe, the use of waste paper is widespread and a large proportion of waste paper is used there in the paper industry for the production of new paper. However, since the cell structures of the waste paper deteriorate and degrade with every new treatment process, waste paper cannot be recycled infinitely often. Therefore, the fiber materials obtained from waste paper have to be mixed or substituted, respectively, with fresh and new fiber materials from conventional sources (such as spruce, fir, pine, larch, beech, poplar, birch, and *eucalyptus* wood). By employing fresh fiber materials, the desired and targeted properties of the paper to be produced are controlled. The paper industry is closely connected to the socioeconomic development and the standard of living of humans. Therefore, along with the rapid economic development and the increase of the standard of living of humans, and the paper demand connected to it, paper production increased dramatically. The demand for a method of producing paper, carton, and cardboard that is based on quickly regenerating raw materials and sustainably reduces environmental damage is therefore large.

The use of the light beige to light brown fiber material obtainable from the baobab tree offers a revolutionary change to the paper, carton, and cardboard production industry since the raw material can be obtained without a clearing or the death of the trees, respectively. Since the raw material can be obtained without felling the baobab tree, simply by peeling of the quickly regenerating baobab tree bast or the baobab fruit, the paper, carton, and cardboard production method provided herein is 100% plant sparing and does not require the killing of the tree. Additionally, many chemical processing steps are obsolete as compared with conventional production methods. For instance, compared with conventional wood material use, no lignin needs to be removed, the removal of which requires employing chemicals damaging to the environment and ultimately to the final consumer. Since the method counteracts worldwide logging for the production of paper, carton, and cardboard, and additionally, less environmentally damaging chemicals need to be employed in the production process, the environment is impacted less and protected sustainably by the method of the invention. Furthermore, the bast fibers and fruit fibers obtained from the baobab tree are characterized by their higher strength and tear resistance compared with other wood fibers. Finally, baobab tree bast contains has a higher fiber content than the same amount of wood. Therefore, the fiber materials obtained from the baobab tree are perfectly suited for processing to paper, carton, and cardboard.

Finally, it should be mentioned that the baobab tree is the center of the cultural, economic, and social spheres of many people. For instance, the baobab tree with its seed and fruit pulp is a valuable foodstuff in Africa. The special standing of the baobab tree is exemplified by its designation "apothecary tree", which is due to the broad medical uses of its parts. For instance, fever, dysentery, pox, and measles are treated with extracts of its fruit pulp and seeds, and it also serves as antidote for injuries with poisonous plants of the genus *Strophantus*, which are native to many parts of Africa.

The tree can be the center of a village and a venue of a market and social events. The development for mass use of this raw material obtained from the baobab tree would therefore improve the economic situation of the people.

Like the fibers of the baobab tree, the bast fibers of the Natal fig or "mutuba" (*Ficus natalensis*) can also be used for the production of paper, carton, or cardboard. The Natal fig occurs from Eastern Africa south of the equator to Southern Africa. In Uganda, for instance, the tree is used as a supplier of bast fiber for the production of bark cloth. The bark of this tree species had been harvested for centuries and processed into an extremely thin bark cloth long before Arab trades brought cotton to East Africa.

The Natal fig belongs to the mulberry family. Shrub forms and trees of up to 30 meters in height with buttress roots and mighty crowns are among its forms of appearance.

The trees provide shadow for crops and domestic animals, protect banana trees sensitive to wind, provide wood for cooking, and the leaves are used as animal feed. Some farmers purposely plant the tree for obtaining bast fiber.

Already after two to five years, the bark of the trunk of two to five meters in length can be harvested for the first time. This is possible once a year. When removing the bark, latex is extruded at the cuts and the exposed cambium is protected very quickly by a brown, viscous fluid. The tree is harvested on up to ⅔ of the trunk length. After a few months, the trunk is again completely surrounded and protected by reddish-brown fibers bundles. Harvesting the bark and the reddish-brown bast fiber is possible for several decades (up to 40 years) without damaging the tree.

Preferably, the bark is harvested during the rainy season and when the leaves are fully grown, since the stream of sap and latex in the cambium and the phloem (bast) is strongest during this period. Detaching the bark is easier in this time and the regeneration of the bast layer is quickest. Thus, death of the tree is avoided. For promoting bark formation, the trunk is wrapped in banana leaves and the upper rim is smoothed.

SUMMARY OF THE INVENTION

Provided herein is a method for the production of paper, carton, or cardboard. The method comprises the following steps:

obtaining baobab fruit fiber and baobab tree bast fiber and/or Natal fig bast fiber as tree raw material, wherein the tree raw material comprises at least 5% baobab fruit fiber, fraying the tree raw material of step a) while adding water, heating and preferably bleaching the fiber pulp obtained in step b), applying the fiber pulp to a sieving means comprising removing a portion of the added water in order to produce a paper fiber fleece, pressing the paper fiber fleece obtained in step d) in order to obtain a leaf of paper, and drying the leaf of paper obtained in step e).

Also provided herein is a method wherein the tree raw material of step a) is obtained from one or more baobab trees of the species *Adansonia grandidieri, Adansonia madagascariensis, Adansonia perrieri, Adansonia rubrostipa (Adansonia fony), Adansonia suarezensis, Adansonia Za., Adansonia digitata, Adansonia kilima,* or *Adansonia gregori (Adansonia gibbosa)*. The baobab tree bast fiber is obtained by peeling off the baobab tree bast (including the bark) of the baobab tree. The baobab fruit fiber is obtained by processing the baobab fruit. The obtaining of the raw material does not entail the death of the baobab tree.

Provided herein is furthermore a method wherein the tree raw material of step a) is obtained from one or more Natal fig trees. The obtaining of the raw material does not entail the death of the Natal fig tree.

Further provided herein is a method using only Baobab fruit fiber as raw material. The paper, carton, or cardboard produced with the method of the invention thus contains no further fiber materials. Alternatively, the baobab raw material obtained in step a) can contain at least 55%, 60%, 70%, 75%, 80%, 85%, 90%, or 95% baobab bast fiber. The raw material obtained in step a) can contain at least 1%, 5%, 10%, 15%, 20%, 25%, 30% or more baobab fruit fiber. The method can use only baobab fruit fibers as baobab raw material.

Further provided herein is a method using only baobab fruit fiber as raw material.

Methods are also provided that use a combination of baobab bast fiber and baobab fruit fiber as raw material. Furthermore, methods are provided that use a combination of baobab bast fiber, baobab fruit fiber, and Natal fig bast fiber as raw material. Likewise, methods are provided that use a combination of baobab fruit fiber and Natal fig bast fiber as raw material.

In a further embodiment, fiber materials obtained from conventional paper raw materials (primary fiber materials) and/or waste paper (secondary fiber materials) may be added to the method. Primary fiber materials can be obtained from one or more of spruce, fir, pine, larch, beech, poplar, birch, and *eucalyptus* wood, as well as cotton. Adding these conventional paper raw materials and/or waste paper or adding the fiber pulp obtained therefrom, respectively, may be comprised by one of the steps b)-d). The method of the invention can thus comprise mixtures of baobab fiber materials (baobab tree bast fibers and/or baobab fruit fibers) and primary and/or secondary fiber materials from conventional paper raw materials. The ratio of baobab and/or Natal fig fiber materials to conventional fiber materials in the fiber mixture can be 9.5:0.5, 9:1, 8:2, 7:3, 6:4, 1:1, 4:6, 3:7, 2:8, 1:9, or 0.5:9.5. The share of baobab fiber material can contain at least 55%, 60, 70%, 75%, 80%, 85%, 90%, or 95% baobab tree bast fibers. The share of baobab fiber material can contain at least 1%, 5%, 10%, 15%, 20%, 25%, 30%, 40%, 45% or more baobab fruit fibers. The share of baobab fiber material can also contain baobab fruit fibers exclusively.

The higher the content of baobab fruit fibers, the higher the tear resistance of the paper. At the same time, the paper becomes heavier with an increasing content of baobab fruit fibers.

In the case of the use of conventional fiber materials in step c), the method of the invention may further comprise the removal of lignin.

In any case, however, the method of the invention may not comprise a removal of lignin.

In one embodiment, step c) may further comprise adding excipients, such as fillers, adhesives, dyes, or special excipients.

The method provided herein can further comprise a step g) comprising refining the paper by calendering, painting, embossing, coating, and/or laminating. Furthermore, step g) can comprise the processing of the paper fiber product obtained in step g) into paper or cardboard.

In a further aspect, the invention provides paper, carton, or cardboard obtained by one of the methods described above. The paper, carton, or cardboard is characterized by a higher tear resistance as compared with paper, carton, or cardboard not containing baobab tree bast fibers, baobab fruit fibers, and/or Natal fig bast fibers.

The paper fiber of the paper, carton, or cardboard produced with the method of the invention may consist entirely of baobab tree fiber materials. The share of baobab tree fiber material can further contain at least 5%, 10%, 20%, 30%, 40%, 50%, 55%, 60%, 70%, 80%, 90%, or 95% baobab tree bast fibers. The share of baobab tree fiber material can contain baobab tree bast fiber exclusively. The share of baobab tree fiber material can contain at least 1%, 2%, 3%, 4%, 5%, 10%, 15%, 20%, 25%, 30%, 40%, 45%, 50% or more baobab fruit fiber. The share of baobab tree fiber material can contain baobab fruit fibers exclusively.

The paper fiber of the paper, carton, or cardboard produced with the method of the invention can consist of at least 5%, 10%, 20%, 30%, 40%, 50%, 55%, 60%, 70%, 80%, 90%, or 95% baobab tree fibers. The share of baobab tree fiber material can further contain at least 5%, 10%, 20%, 30%, 40%, 50%, 55%, 60%, 70%, 80%, 90%, or 95% baobab tree bast fibers. The share of baobab tree fiber material can contain baobab tree bast fiber exclusively. The share of baobab tree fiber material can contain at least 1%, 2%, 3%, 4%, 5%, 10%, 15%, 20%, 25%, 30%, 40%, 45%, 50% or more baobab fruit fiber. The share of baobab tree fiber material can contain baobab fruit fibers exclusively.

The paper fiber of the paper, carton, or cardboard produced with the method of the invention can consist of at least 5%, 10%, 20%, 30%, 40%, 50%, 55%, 60%, 70%, 80%, 90%, or 95% Natal fig bast fibers.

The use of Natal fig bast fibers imparts a higher tear resistance to the paper, carton, or cardboard produced.

Finally, the invention provides the use of the paper, carton, or cardboard for the production of natural paper, papier mâché, art paper, hygienic paper, tissue paper, graphic papers, paper, carton, or cardboard for packaging purposes, or paper for specialized technical purposes.

DETAILED DESCRIPTION

The method provided herein is directed to the use of raw materials obtained from the baobab tree (baobab raw material) and/or of raw materials obtained from the Natal fig tree (Natal fig raw material) for the production of paper, carton, or cardboard.

Paper, carton, and cardboard are sheet-like materials made of the same basic materials (paper raw materials) and with basically the same production methods. They differ mainly in terms of mass per unit area (grammage, $g/m^2$ weight). According to DIN 6730, the weight per unit area (grammage) of paper is up to 225 $g/m^2$; what lies above this is called cardboard. Although the designation carton is not officially known, one speaks of paper when the grammage is between 7 and 150 $g/m^2$, of carton between 250 and 500 $g/m^2$, and of cardboard if it is above 600 $g/m^2$. The ranges 150-250 $g/m^2$ and 500-600 $g/m^2$ are ambiguous, meaning the designations paper or carton and carton or cardboard may be used, respectively. Mostly, however, the strength will be decisive. As used herein, the terms paper, carton, and cardboard include all sheet materials consisting of fibers of plant origin that are encompassed by both the definition of DIN 6730 and German language usage.

The term "raw materials" as used herein has the usual meaning to one skilled in the papermaking art and comprises all conventional raw materials known in the art of papermaking. Raw materials for papermaking thus comprise all fibrous materials, e.g. groundwood, semi-chemical pulp, chemical pulp, waste paper and other fiber materials. In addition, the term includes the finishing processes such as sizing and impregnation. In these operations, raw materials such as animal glues, resins, paraffins and waxes, fillers such as kaolin, talc, gypsum, barium sulfate, chalk, titanium white, and excipients such as dyes, defoamers, dispersants, retention agents, flocculants and wetting agents are used depending on the application of the final product.

The term "fiber material" refers to plant-derived fiber material (plant fiber). The term comprises both primary fiber materials, i.e. raw materials used for the first time in production, as well as secondary fiber materials, i.e. recycled materials reentering the production process after use, such as waste paper. The most important fiber material components are those consisting of cellulose. In addition, lignin is also a fiber material component. Wood pulps, such as groundwood, contain large amounts of lignin. In semi-chemical pulps, the lignin content is reduced, so that the cellulose content dominates. Chemical pulp, on the other hand, consists almost entirely of cellulose. These fiber materials are usually produced from wood by mechanical or chemical-mechanical processes and are used mainly for the production of paper for different purposes or in different qualities, for cardboard, and carton.

"Baobab raw material" as used herein refers to fiber materials obtained from the baobab tree which serve as a raw material for the production of paper, carton, or cardboard according to the invention. The baobab tree, also known as monkey bread tree, employed for obtaining raw material is a genus of large, prominent and often bizarrely growing deciduous trees from the subfamily of the bombax family (Bombacoideae), which in turn belong the mallow family (Malvaceae). Baobab trees occur in much of the African continent, on the island of Madagascar, and in Australia. The baobab trees used for obtaining baobab raw material include *Adansonia grandidieri, Adansonia madagascariensis. Adansonia perrieri, Adansonia rubrostipa (Adansonia fony), Adansonia suarezensis, Adansonia Za., Adansonia digitata, Adansonia kilima*, or *Adansonia gregori (Adansonia gibbosa)*. The invention is based on the use of the plant fibers obtained from the baobab tree. Baobab raw material includes in particular the bast fibers of the bark (baobab tree bast fibers) and fibers of the fruits (baobab fruit fibers) obtained from the baobab tree. The bast is the living tissue under the bark (outermost layer) of trees and other woody plants (secondary phloem). The baobab tree bast fibers are found in the second protective layer of the bark. As the baobab tree bast and the bark regenerate within one year, usually after 6-8 months, obtaining the baobab tree bast does not result in the death of the tree.

"Natal fig raw material" as used herein refers to fiber materials obtained from the Natal fig tree (*Ficus natalensis*) which serve as a raw material for the production of paper, carton, or cardboard according to the invention.

"Tree raw material" as used herein is a raw material comprising baobab raw material and/or Natal fig raw material.

The method provided herein comprises firstly obtaining the tree raw material, or the baobab tree bast fibers, baobab fruit fibers, and/or Natal fig bast fibers, respectively.

In order to reach the bast layer of the baobab tree, common methods are preferably used. In order for the tree not to suffer any damage and the bark to be able to regrow or regenerate, no heavy and large machines are used. Grooves 1-30 mm deep are cut into the tree bark by hand, using conventional, suitable cutting tools such as forged machetes and saws. The height of the grooves depends on the size of the tree. Starting from these grooves, the bark and the bast fibers are peeled off. The bast fibers, which are up to 25 meters long, are separated from the bark by hand and using forged machetes and saws and stored separately. In order to reach the baobab fruit fibers, the baobab fruit must first be harvested and then cracked open. The cracking of the fruit can be performed in any imaginable way which preserves the interior of the fruit. For example, the fruits can be cracked with a hammer or hard impact tool, respectively. The fibers are located below the shell inside the fruit and connect the fruit pulp to the inside of the shell. In addition, they provide the fruit pulp with the necessary nutrients. After cracking the fruit, the fruit fibers can be separated from the shell by hand and stored separately.

In order to reach the bast layer of the mutuba tree, common methods are preferably used. In order for the tree not to suffer any damage and the bark to be able to regrow or regenerate, no heavy and large machines are used. Grooves 1-30 mm deep are cut into the tree bark by hand, using conventional, suitable cutting tools such as forged machetes and saws. The height of the grooves depends on the size of the tree. Starting from these grooves, the bark and the bast fibers are peeled off. The bast fibers, which are up to 25 meters long, are separated from the bark by hand and using forged machetes and saws and stored separately.

The tree raw material thus obtained is then frayed for further processing while adding water. The fraying can be performed by any method known in the art. It can be performed mechanically, thermomechanically, or chemically. For example, in the grinding process, the baobab raw material is mechanically frayed with the aid of grindstones. Alternatively, fraying can be accomplished using a grinder or hammer mill. In the so-called refining process, shredding to chips is followed, after further process steps, by fraying in the refiner (thermomechanically). The degree of fraying determines essential properties of the paper, carton, or cardboard produced. The longer the fibers are, the stronger the resulting product will be.

The soaking of the fibers, already started during the fraying, is then continued in a further working step. In the process, the fiber mush (pulp) obtained during fraying is heated. The heating is carried out to least 80° C., 85° C., 90° C., 95° C., 100° C., 105° C., 110° C., 115° C., 120° C., or more. For example, the pulp may be heated to between 80° C. and 120° C., 85° C. and 120° C., 90° C. and 115° C., and 95° C. and 115° C. The heating is preferably carried out by boiling the pulp, i.e. heating up to and around the boiling point. The temperature range for loosening the fibers extends from 30° C. to 350° C. The preferred temperature range is between 95° C. and 115° C. in boiling water. The heating is carried out at at least 1, 1.5, 2, 2.5, 3, 3.5, 4, 4.5, 5 or more bar. The heating takes place for at least 30, 60, 90, 120, 150, or 180 min. and can last up to 72 h. The heating preferably further comprises bleaching the pulp. Bleaching can be carried out with the aid of any bleaching agents known in the art. Oxidants (oxidative bleaching) and reducing agents (reductive bleaching) can be used as bleaching agents. Oxidants suitable bleaching include oxygen, peroxides such as hydrogen peroxide, perborates, percarbonates, peroxyacetic acid, and chlorine compounds such as chlorine, hypochlorites, and chlorine dioxide. Suitable reducing agents include dithionites and sulfur dioxide. For the production of white paper, the fibers are bleached with hydrogen peroxide ($H_2O_2$). The concentration of the bleaching agent ranges from 3 to 99 percent. Preferably, a 7-10% solution is used. Bleaching is carried out in the pretreatment step of heating and loosening the fiber materials. Furthermore, other bleaching agents can be used. Bleaching may be carried out by bleaching agents such as ammonia ($NH_3$), caustic soda (NaOH), oxalic acid (also called ethanedioic acid or clover acid $C_2H_2O_4$), oxygen bleach, chlorine dioxide ($ClO_2$), hypochlorite ($ClO^-$), and elemental chlorine (Cl). The more sustainable and environmentally friendly but higher priced version with hydrogen peroxide ($H_2O_2$) is preferably used.

After bleaching, excipients may optionally be added to the fiber pulp. Excipients are non-fibrous additives for papermaking that impart special properties to paper, carton, or cardboard that cannot be achieved with fiber materials alone. Such excipients include fillers, sizing agents, dyes, and special excipients. Fillers are white, water-insoluble compounds (pigments) of the smallest particle size. They serve to fill in the tiny gaps between the matted fibers. Generally, minerals such as kaolin, talc, gypsum, calcium carbonate, barium sulfate, chalk, titanium white, or starch are used as fillers. The content can be up to 30%. Sizing agents are natural resins, synthetic resins, waxes, binders, paraffins, or starch which are added to the paper mass to reduce absorbing capacity. If the sizing agents are fed directly to the paper pulp, it is called sizing in the fabric (fabric sizing or mass sizing). If, on the other hand, the sizing agents are only applied to the paper web (paper fiber fleece) in the paper machine, this is called surface sizing. Dyes are added to the paper pulp to color the paper and to achieve special color effects in colored and trim papers. Even white papers are often tinted bluish to mask the slight yellow hue of many fibers and thereby increase the whiteness. As with sizing, the dyes can either be added to the paper pulp (called fabric dyeing) or applied to the finished paper web (paper felt/paper fleece), which is referred to as surface dyeing. Special excipients may be optical brighteners. They convert invisible ultraviolet radiation into visible blue light, making the paper appear lighter and whiter. Other excipients may have the task of making paper flame-proof or protecting it from insect or fungal attack. The excipient(s) are added to the heated and bleached paper fibers and stirred into a homogeneous mixture (paper pulp).

Subsequently, the paper pulp may be homogenized.

In the next step, the pulp is now applied to a sieving means. "Sieving means" comprises any device for separating solids according to the criterion of grain size and/or for separating solid(s) and liquid(s). The separation is carried out by applying the paper pulp to the sieve plate or sieve coating, a finer or coarser metal, textile, or plastic fabric, mesh, braid, sheet or the like, as needed. The sieve bottom or sieve lining is characterized by perforations. The term "sieving means" includes, for example, the sieving screens used in traditional papermaking as well as the sieve webs or endless sieves, woven sieves, spiral sieves and long or bottom sieves used in machine papermaking. The application may occur using the means and methods known in the art. For example, the application can be effected by spraying the fiber pulp through nozzles or slits of a spraying device onto the sieving means. This is also possible by the so-called falling, pushing or squeegee application. On the sieving means, the fibers are deposited next to and upon each other, while at the same time the majority of the supplied water is filtered off in the sieving means. The fibers contained in the pulp are matted into a coarse paper fiber fleece. This process is also called sheet formation.

The paper fiber fleece is then pressed by suitable pressing means to a finer paper sheet. At the same time more liquid is withdrawn from the paper fiber fleece during pressing. "Pressing" as used herein refers to the application of mechanical forces to drain the paper fiber fleece under pressure. Suitable pressing means are: mechanical pressing between two plates with a pressure of 2 to 4000 hPa; hydraulic pressing between two plates with a pressure of 2 to 4000 hPa; pneumatic pressing between two plates with a pressure of 2 to 4000 hPa; or an interaction of the three or two of the three between two plates with a pressure of 2 to 4000 hPa. A pressure of at least 16 hPa is preferred. Traditional pressing means consist of several successive presses in which the paper fleece is drained by means of cylinders (e.g. of steel, granite, or hard rubber) between felts. Exemplary pressing means include the classic two-cylinder presses, multi-cylinder compact presses, and modern "shoe presses" in which a specially shaped press shoe is pressed against the backing cylinder. The pressing process compresses the paper structure, the strength increases and the surface quality is decisively influenced.

In the next step, further drying of the paper sheet occurs. For this purpose, the paper sheet is heated and dried by evaporation of the remaining water. The drying determines the later shrinkage and thus the final dimensions of the paper sheet. The drying additionally ensures that the paper is no longer moist and therefore protected against molds. Drying can be carried out, for example, by a number of steam-heated drying cylinders which the paper fiber fleece or paper sheet passes through.

Optionally, the paper sheet can subsequently be processed further or finished. For satinizing, for example, the paper is further smoothed by means of a calender. For painting, the surface is finished with a coating color ("coating") consisting of pigments (kaolin, chalk, lime, satin white), binders (plastic dispersions, starch, or casein), and/or other additives known in the art. The paper gets a closed, smooth and stable surface, which results in better print quality. The paper can also be embossed, i.e. provided with a structure. The surface obtains its appearance by means of an embossing calender containing an engraved steel cylinder. The result is papers that are ribbed, grained, veined, or hammered. Another form of finishing or surface type is the coating, e.g. with plastics or varnishes, to make the paper or cardboard wipe- and waterproof or even aroma-tight. Finishing also includes laminating, e.g. the joining of paper and cardboard, paper/paper/plastic or metal foils with paper, carton, or cardboard.

EXAMPLES

The present invention is described in detail by the following non-limiting examples.

Example 1: Handmade DIN A4 BAO Art Paper for Artists' Supplies

In this example, a baobab (BAO) art paper was prepared from the bast fibers of the bark of the baobab tree.

Obtaining the Baobab Tree Bast Fibers and Boiling

The bast fibers of the bark are to be found in the second protective layer of the bark. In order to get to this second layer, common methods are preferably used. In order for the tree not to suffer damage and the bark be able to regrow, no heavy and large machines were used for this purpose. Notches up to 50 mm deep were cut into the tree bark by hand with common machetes and saws forged for this purpose. The height of the notches depended on the size of the tree. Starting from these notches, the bark and the bast fibers were peeled off. The bast fibers up to two meters long were separated from the bark by hand using special tools and stored separately. The bast fibers of the bark were cut in a shredder into fine pieces of the same size (strips of about 1 to 10 mm) and collected in a collecting basin. Unusable parts of the shell and other undesirable elements, such as mud and stones, were separated from the needed fibers in a water bath.

Fraying and Boiling of the Obtained Fiber Pulp

The already softened strips were further softened by boiling and macerated in a water bath with plenty of water in the next step of this example. For this example, 100 g raw material of the fibers was sufficient. 100 g of the strips were prepared in a pot with three liters of deionized water and boiled. The temperature of the liquid was increased until boiling. As a result, the speed of softening and loosening of the fibers increased significantly. The softening already took place at a water temperature of 50° C. The preferred temperature for loosening the fibers was between 95° C. and 115° C. and above 1 bar pressure in the pot. The conditioning time was 60 to 180 minutes under these conditions.

Bleaching of the Fiber Pulp

Bleach was then added to the loosened and boiled fiber pulp. Preference is given to using environmentally friendly bleaching agents. Here, hydrogen peroxide ($H_2O_2$) was used. Hydrogen peroxide dissolved in water is a very weak acid and not harmful to the environment. Bleaching with hydrogen peroxide was sufficient with a solution of 7%. 100 ml of a 30% solution were added to the pot containing the three liters of fiber pulp prepared above. The fiber pulp containing the bleach was now additionally warmed and boiled. The same parameters for time, temperature and pressure were used as for boiling. For further processing of the fiber pulp, the hydrogen peroxide was completely washed out of the solution. The largest part of the hydrogen peroxide had already decomposed by dissolution in water and the subsequent heating.

Applying the Fiber Pulp to a Sieve

The fibers bleached white were now washed under running water in a sieve. The washed fibers were placed in a water bath and stirred evenly with a rod or similar device. The water bath contained a tub (so-called vat) with deionized water at a temperature of 20 to 23° C. The tub was free of metallic materials such as aluminum or the like, otherwise chemical reactions could have occurred with the residual hydrogen peroxide in the fibers. Tubs are therefore made of plastic, preferably polyethylene (PE). Afterwards scooping by hand was done. A common scooping sieve, size DIN A4, was used. The scooping sieve was put into the vat by hand. When removing the sieve from the vat, care was taken to cover the entire sieve area with fibers and to distribute the mass evenly throughout. After partial draining, a coarse paper fiber fleece remained on the scooping sieve.

Couching/Drying and Smoothing of the Paper Fiber Fleece

The screened paper fiber fleece was then tipped onto a felt that had at least the dimensions of the scooping sieve. Usually it is about 20% larger. The tipped material was then covered with another felt. The felts served to absorb the excess liquid from the paper and thus at the same time for drying. This was followed by pressing the paper fiber fleece. For this, the stack of felt and paper fiber fleece stack was weighted down. Weights can usually be used from about 80 kg (800 N), here 200 kg (2000 N) were used. Mechanical pressing by machine can provide here for a better quality and smoothness of the sheet. This process was repeated until the paper was dry. The wet felts were each replaced by dry felts. As a rule, a pressing and waiting period of at least 60 minutes is reckoned with.

The handmade and dried BAO art paper was now ready for use and could be employed.

Example 2: Handmade DIN A5 BAO Art Carton for Artists' Supplies

In this example, a baobab (BAO) art paper was prepared from the bast fibers of the bark of the baobab tree and the fibers obtained from its fruits.

Obtaining the Baobab Tree Bast Fibers and Fruit Fibers

The baobab tree bast fibers were obtained as in Example 1. Additionally, fibers were obtained from the fruits. The fibers are located below the shell in the interior of the fruit and connect the fruit pulp with the interior of the shell.

Furthermore, they supply the fruit pulp with the required nutrients. The fruits were harvested by hand and cracked open with a hammer or hard impact tool, respectively. Subsequently, the fruit fibers were separated from the shell by hand.

The bast fibers of the bark and the fibers of the fruit shells were cut in a shredder into fine pieces of the same size (strips of about 1 to 10 mm) and collected in a collecting basin. Unusable parts of the shell and other undesirable elements, such as mud and stones, were separated from the needed fibers in a water bath.

Fraying and Boiling of the Obtained Fiber Pulp

The already softened strips were further softened by boiling and macerated in a water bath with plenty of water in the next step of this example. For this example, 250 g raw material of the fibers was sufficient. 250 g of the strips were prepared in a pot with four liters of deionized water and boiled. The temperature of the liquid was increased until boiling. As a result, the speed of softening and loosening of the fibers increased significantly. The softening already took place at a water temperature of 50° C. The preferred temperature for loosening the fibers was between 95° C. and 115° C. and above 1 bar pressure in the pot. The conditioning time was 60 to 180 minutes under these conditions.

Bleaching of the Fiber Pulp

Bleach was then added to the loosened and boiled fiber pulp. Preference is given to using environmentally friendly bleaching agents. Here, hydrogen peroxide ($H_2O_2$) was used. Hydrogen peroxide dissolved in water is a very weak acid and not harmful to the environment. Bleaching with hydrogen peroxide was sufficient with a solution of about 8-10%. 200 ml of a 30% solution were added to the pot containing the four liters of fiber pulp prepared above. The fiber pulp containing the bleach was now additionally warmed and boiled. The same parameters for time, temperature and pressure were used as for boiling. For further processing of the fiber pulp, the hydrogen peroxide was completely washed out of the solution. The largest part of the hydrogen peroxide had already decomposed by dissolution in water and the subsequent heating.

Applying the Fiber Pulp to a Sieve

The fibers bleached white were now washed under running water in a sieve. The washed fibers were placed in a water bath and stirred evenly with a rod or similar device. The water bath contained a tub (so-called vat) with deionized water at a temperature of 20° to 23° C. The tub was free of metallic materials such as aluminum or the like, otherwise chemical reactions could have occurred with the residual hydrogen peroxide in the fibers. Tubs are therefore made of plastic, preferably polyethylene (PE). Afterwards scooping by hand was done. A common scooping sieve, size DIN A5, was used. The scooping sieve was put into the vat by hand. When removing the sieve from the vat, care was taken to cover the entire sieve area with fibers and to distribute the mass evenly throughout. After partial draining, a coarse paper fiber fleece remained on the scooping sieve.

Couching/Drying and Smoothing of the Paper Fiber Fleece

The screened paper fiber fleece was then tipped onto a felt that had at least the dimensions of the scooping sieve. Usually it is about 20% larger. The tipped material was then covered with another felt. The felts served to absorb the excess liquid from the paper and thus at the same time for drying. This was followed by pressing the paper fiber fleece. For this, the stack of felt and paper fiber fleece stack was weighted down. Weights can usually be used from about 80 kg (800 N), here 200 kg (2000 N) were used. Mechanical pressing by machine can provide here for a better quality and smoothness of the sheet. This process was repeated until the paper was dry. The wet felts were each replaced by dry felts. As a rule, a pressing and waiting period of at least 60 minutes is reckoned with.

The handmade and dried BAO art paper was now ready for use and could be employed.

Example 3: Machine Production of Reel Cardboard from Pure Baobab Fibers with a Paper Machine In this example, baobab (BAO) reel cardboard was prepared from the bast fibers of the bark of the baobab tree and the fibers obtained from its fruits using a common paper machine.

Obtaining the Baobab Tree Bast Fibers & Fruit Fibers

The baobab tree bast fibers and baobab fruit fibers were obtained as in Examples 1 and 2.

Fraying of the Baobab Tree Bast Fibers and Fruit Fibers

The already softened strips were further softened by boiling and macerated in a water bath with plenty of water in the next step of this example. Additionally, the fruit shells were subjected to a grinding and shredding process and processed into powder. The powder served as a filler, provided later for a higher density of the paper, and lowered the bast fiber content to as low as 45%.

Boiling the Obtained Fiber Pulp

The obtained fibers are mixed, stirred, and boiled in a stirred tank, the so-called "pulper", with plenty of running water. The addition of water during the stirring and mixing took place until an aqueous paper fiber pulp formed. The solution was further stirred for 30 minutes to obtain a more homogeneous paper fiber pulp.

Applying the Fiber Pulp to a Sieve

The paper fiber pulp was then distributed through the headbox of the paper machine onto a screen web. The screen web was then shaken horizontally to distribute the fibers more uniformly throughout the screen area. The aim of the shaking is to remove as much water as possible from the applied paper pulp, so that the fiber materials combine or mat together, respectively. The application to the screen web thus provided for the first separation between fiber material and excess water and resulted in a coarse paper fiber fleece web. The shaking and the movement of the screen web the drained about 20% water from the paper fiber fleece.

Pressing and Drying the Coarse Paper Fiber Fleece Web

In order to further reduce the amount of residual moisture, the paper fiber fleece web was drained of about 15% moisture by means of a felt web and mechanical pressing. As a result, a further stiffening of the paper fiber fleece web was achieved. The paper fiber fleece web had a residual moisture content of about 65% after felt processing. In the subsequent step, the paper fiber fleece web was fed into the drying section including a steam-heated cylinder system. The speed and temperature of the cylinders were adjusted so that at the end of the web, the cardboard had a residual moisture content of about 8-10%. If this residual moisture content is not retained, the paper or cardboard becomes very brittle and can no longer be rolled up. The hydrogen bonds formed during the drying process held the fibers together tightly. At the end of the drying process, a paper or cardboard web was obtained. The cardboard web was rolled up in the last working area of the paper machine. The paper fiber pulp was applied to the screen such that the cardboard had a grammage of between 100-150 $g/m^2$, 150-200 $g/m^2$, 200-250 $g/m^2$, 250-300 $g/m^2$, 300-350 $g/m^2$, or 350-400 $g/m^2$. From 100 kg of fiber pulp, three rolls with about 35 kg of raw cardboard each were produced. The raw cardboard rolls were then ready for further finishing processes such as coating and/or further processing to corrugated cardboard.

Example 4: Machine Production of Reel Paper from Pure Baobab Fibers in the Paper Machine In this example, baobab (BAO) reel paper was prepared from the bast fibers of the bark of the baobab tree and the fibers obtained from its fruits using a common paper machine.

Obtaining the Baobab Tree Bast Fibers & Fruit Fibers

The baobab tree bast fibers and baobab fruit fibers were obtained as in Examples 1 and 2.

Fraying of the Baobab Tree Bast Fibers and Fruit Fibers

The already softened strips were further softened by boiling and macerated in a water bath with plenty of water in the next step of this example. Additionally, the fruit shells were subjected to a grinding and shredding process and processed into powder. The powder served as a filler, provided later for a higher density of the paper, and lowered the bast fiber content to as low as 45%.

Boiling the Obtained Fiber Pulp

The obtained fibers are mixed, stirred, and boiled in a stirred tank, the so-called "pulper", with plenty of running water, and bleached by adding a hydrogen peroxide ($H_2O_2$) solution (ca. 10%). The addition of water during the stirring and mixing took place until an aqueous paper fiber pulp formed. The solution was further stirred for 30-90 minutes to obtain a more homogeneous paper fiber pulp including the bleach.

Applying the Fiber Pulp to a Sieve

The paper fiber pulp was then distributed through the headbox of the paper machine onto a screen web. The screen web was then shaken horizontally to distribute the fibers more uniformly throughout the screen area. The aim of the shaking is to remove as much water as possible from the applied paper pulp, so that the fiber materials combine or mat together, respectively. The application to the screen web thus provided for the first separation between fiber material and excess water and resulted in a coarse paper fiber fleece web. The shaking and the movement of the screen web the drained about 20% water from the paper fiber fleece.

Pressing and Drying the Coarse Paper Fiber Fleece Web

In order to further reduce the amount of residual moisture, the paper fiber fleece web was drained of about 15% moisture by means of a felt web and mechanical pressing. As a result, a further stiffening of the paper fiber fleece web was achieved. The paper fiber fleece web had a residual moisture content of about 65% after felt processing. In the subsequent step, the paper fiber fleece web was fed into the drying section including a steam-heated cylinder system. The speed and temperature of the cylinders were adjusted so that at the end of the web, the cardboard had a residual moisture content of about 8-10%. If this residual moisture content is not retained, the paper becomes very brittle and can no longer be rolled up. The hydrogen bonds formed during the drying process held the fibers together tightly. At the end of the drying process, a paper web was obtained. The paper web was rolled up in the last working area of the paper machine. The paper fiber pulp was applied to the screen such that the paper had a grammage of between 50-55 $g/m^2$, 55-60 $g/m^2$, 60-65 $g/m^2$, 65-70 $g/m^2$, 70-75 $g/m^2$, 75-80 $g/m^2$, or 80-90 $g/m^2$. From 100 kg of fiber pulp, three rolls with about 35 kg of raw paper each were produced. The raw paper rolls were then ready for further finishing processes such as coating and/or further processing to corrugated cardboard.

Paper Coating

The aim of paper coating is to obtain paper with as high a degree of whiteness and high gloss as possible. Usually paper coating takes place both on so-called off-line coating machines and online in direct connection with a paper machine. In this example, the off-line method of a coating machine with a blade coating system was used. The latter was exactly adapted to the roll breadth. The raw materials used for the coating material can be divided into the following categories:

a. Pigments: calcium carbonate ($CaCO_3$), kaolinite ($Al_4[(OH)_8|Si_4O_{10}]$);
b. Binders: modified starch, carboxymethyl cellulose (CMC), polyvinyl alcohol (PVA), styrene-butadiene latex, styrene-acrylate latex, acrylic acid ester, carboxylated acrylate copolymer,
c. Excipients: associative thickener, calcium stearate, optical brightener, caustic soda.

The following formulation was used for mixing the coating paint: 250 ml of pigment slurry (dry matter 78%, amount 195 g), 100 parts of calcium carbonate: 195 g (equivalent to 94.7%); 1 part CMC: 2 g (equivalent to 0.95%); 2 parts styrene-butadiene latex: 4 g (equivalent to 1.9%); 2 parts styrene-acrylate latex: 4 g (equivalent to 1.9%); 0.5 parts calcium stearate: 1 g (equivalent to 0.47%).

The cylinder was clamped into the sleeve of the coating machine. The sleeve holder with an empty paper cylinder for receiving the unwound and freshly coated paper roll was set at the same time. An elastic squeegee blade was filled with coating paint and the coating gap was placed as close as possible to the web. The elastic squeegee blade dosed and leveled the line by damming the coating excess and allowing it to flow back into the coating trough. By using a squeegee blade sharpened to be nick-free, the coating paint was evenly distributed over the entire breadth of the web. The coated paper now had a higher degree of whiteness than the raw paper. Likewise, the gloss, the smoothness, and the opacity had increased enormously compared to the raw paper.

Example 5: Production of a Handmade Mixed Art Paper from Baobab and Waste Piper Fibers (Ratio 50:50)

In this example, a baobab (BAO) art paper was produced from baobab raw material, consisting of baobab tree bast fibers and baobab fruit fibers, and recycled fibers from waste paper. In this example, 50% (100 g) of pure baobab fibers were mixed with 50% (100 g) waste paper fibers in the form of old newspapers.

Obtaining the Baobab Tree Bast Fibers and Fruit Fibers

The baobab tree bast fibers and baobab fruit fibers were obtained as in Examples 1 and 2.

Fraying and Boiling of the Obtained Fiber Pulp

The already softened strips were further softened by boiling and macerated in a water bath with plenty of water in the next step of this example. For this example, 200 g raw material were sufficient. 100 g of the strips were prepared in a pot with 100 g waste paper and 3 liters of deionized water and boiled. The temperature of the liquid was increased until boiling. As a result, the speed of softening and loosening of the fibers increased significantly. The softening already took place at a water temperature of 50° C. The preferred temperature for loosening the fibers was between 95° C. and 115° C. and above 1 bar pressure in the pot. The conditioning time was 60 to 180 minutes under these conditions.

Bleaching of the Fiber Pulp

Bleach was then added to the loosened and boiled fiber pulp. Preference is given to using environmentally friendly bleaching agents. Here, hydrogen peroxide ($H_2O_2$) was used. Hydrogen peroxide dissolved in water is a very weak acid and not harmful to the environment. Bleaching with hydrogen peroxide was sufficient with a solution of 7%. 100 ml of a 30% solution were added to the pot containing the 3 liters of fiber pulp prepared above. The fiber pulp containing the bleach was now additionally warmed and boiled. The same parameters for time, temperature and pressure were used as for boiling. For further processing of the fiber pulp, the hydrogen peroxide was completely washed out of the solution. The largest part of the hydrogen peroxide had already decomposed by dissolution in water and the subsequent heating.

Applying the Fiber Pulp to a Sieve

The fibers bleached white were now washed under running water in a sieve. The washed fibers were placed in a water bath and stirred evenly with a rod or similar device. The water bath contained a tub (so-called vat) with deionized water at a temperature of 20° to 23° C. The tub was free of metallic materials such as aluminum or the like, otherwise chemical reactions could have occurred with the residual hydrogen peroxide in the fibers. Tubs are therefore made of plastic, preferably polyethylene (PE). Afterwards scooping by hand was done. A common scooping sieve, size DIN A4, was used. The scooping sieve was put into the vat by hand. When removing the sieve from the vat, care was taken to cover the entire sieve area with fibers and to distribute the mass evenly throughout. After partial draining, a coarse paper fiber fleece remained on the scooping sieve.

Couching/Drying and Smoothing of the Paper Fiber Fleece

The screened paper fiber fleece was then tipped onto a felt that had at least the dimensions of the scooping sieve. Usually it is about 20% larger. The tipped material was then covered with another felt. The felts served to absorb the excess liquid from the paper and thus at the same time for drying. This was followed by pressing the paper fiber fleece. For this, the stack of felt and paper fiber fleece stack was weighted down. Weights can usually be used from about 80 kg (800 N), here 200 kg (2000 N) were used. Mechanical pressing by machine can provide here for a better quality and smoothness of the sheet. This process was repeated until the paper was dry. The wet felts were each replaced by dry felts. As a rule, a pressing and waiting period of at least 60 minutes is reckoned with.

The handmade and dried BAO art paper was now ready for use and could be employed.

The invention claimed is:

1. A method for the production of paper, cardboard, or carton comprising the following steps:
    a) obtaining baobab fruit fiber and, optionally, baobab bark bast fiber and/or Natal fig bast fiber as a tree raw material, wherein the tree raw material comprises at least 5% baobab fruit fiber,
    b) defibering the tree raw material of step a) while adding water in a defibering apparatus,
    c) heating the fiber pulp obtained in step b),
    d) applying the fiber pulp on a sieving means for removing a fraction of the added water to create a non-woven fabric of paper fiber,
    e) pressing the non-woven fabric of paper fiber obtained in step d), and
    f) drying the non-woven fabric of paper fiber obtained in step e).

2. The method of claim 1, wherein the tree raw material consists of a combination of baobab bark bast fiber and baobab fruit fiber.

3. The method of claim 1, wherein the tree raw material consists of a combination of baobab bark bast fiber, baobab fruit fiber and Natal fig bast fiber.

4. The method of claim 1, wherein the tree raw material consists of a combination of baobab fruit fiber and Natal fig bast fiber.

5. The method of claim 1, wherein the baobab bark bast fiber is obtained by peeling off the baobab bark bast from a baobab tree.

6. The method of claim 1, wherein the Natal fig bast fiber is obtained by peeling off the Natal fig bast from a Natal fig tree.

7. The method of claim 1, wherein one of steps b)-c) comprises adding of conventional paper raw materials and/or used paper and adding the fiber pulp obtained therefrom, respectively and/or further comprising step g), which comprises processing the paper fiber product obtained in step f) to cardboard or carton.

8. The method of claim 7, wherein the ratio of tree raw material to conventional paper raw materials/used paper in the paper raw material mixture is 9.5:0.5, 9:1, 8:2, 7:3, 6:4, 1:1, 4:6, 3:7, 2:8, 1:9, or 0.5:9.5, and/or wherein the conventional paper raw materials comprise one or more of cotton, *eucalyptus*, beech, poplar, birch, spruce, fir, pine, and larch wood.

9. The method of claim 1, wherein the tree raw material of step a) comprises 55% to 95% baobab bark bast fiber.

10. The method of claim 1, wherein step c) further comprises bleaching the fiber pulp obtained in step b) subsequent to heating the fiber pulp.

11. The method of claim 10, wherein step c) further comprises adding one or more excipients to the fiber pulp.

12. The method of claim 11, wherein the one or more excipients are selected from glues, binding agents, starch, waxes, and dyes.

13. The method of claim 1, wherein step f) further comprises coating the non-woven fabric of paper fiber with lime.

14. The method of claim 1, wherein step c) further comprises removing lignin.

15. The method of claim 1,
    a) wherein the baobab bark bast fiber and/or the baobab fruit fiber is obtained from one or more baobab trees which belong to the species *Adansonia grandidieri, Adansonia madagascariensis, Adansonia perrieri, Adansonia rubrostipa (Adansonia fony), Adansonia suarezensis, Adansonia Za., Adansonia digitata, Adansonia kilima*, or *Adansonia gregori (Adansonia gibbosa)*; and/or
    b) wherein obtaining the raw material in step a) does not result in the perishing of the respective baobab or Natal fig tree.

16. The method of claim 1, wherein the paper fiber of the paper, cardboard, or carton contains:
    (i) exclusively baobab tree fruit fiber; or
    (ii) 5% to 95% baobab tree bast fiber; or
    (iii) 5% to 95% Natal fig bast fiber.

17. The method of claim 1, wherein the method does not comprise removing lignin.

* * * * *